INVENTORS
FRED T. SENS &
CHARLES J. STALEGO
BY
ATTORNEYS

April 12, 1966 F. T. SENS ETAL 3,245,767
METHOD AND APPARATUS FOR FORMING FINE FIBERS
Filed July 6, 1961 4 Sheets-Sheet 2

INVENTORS
FRED T. SENS &
BY CHARLES J. STALEGO
ATTORNEYS

INVENTORS
FRED T. SENS &
BY CHARLES J. STALEGO

ATTORNEYS

April 12, 1966 F. T. SENS ETAL 3,245,767
METHOD AND APPARATUS FOR FORMING FINE FIBERS
Filed July 6, 1961 4 Sheets-Sheet 4

INVENTORS
FRED T. SENS &
BY CHARLES J. STALEGO

ATTORNEYS

United States Patent Office 3,245,767
Patented Apr. 12, 1966

3,245,767
METHOD AND APPARATUS FOR FORMING
FINE FIBERS
Fred T. Sens and Charles J. Stalego, Newark, Ohio, assignors to Owens-Corning Fiberglas Corporation, a corporation of Delaware
Filed July 6, 1961, Ser. No. 122,122
11 Claims. (Cl. 65—2)

This invention relates to a method and apparatus for producing fine fibers of thermoplastic materials. The techniques herein disclosed are applicable to the production of inorganic fibers of materials such as glass or mineral wool compositions and also to the production of organic fibers of materials such as polyethylene, polystyrene, melamine resins, nylon, rubber, cellulose acetate, copolymers of vinylidene chloride, vinyl cyanide, etc.

More specifically, this invention relates to the production of discontinuous fibers by attenuating them from a pool of molten material located between diverging surfaces and a method of harvesting these fibers. The fibers formed by this process are generally collected as a lightweight porous mass on a conveyor or other suitable collecting device. Such lightweight masses of fibers lend themselves to uses as insulating materials for houses and other structures, and when compressed or densified they form excellent heat and sound insulating boards.

The formation of fibers by attenuating molten fiber forming material between the diverging surfaces of two coacting wheels or drums has been known in the art and such a process, utilizing two or more narrow wheels, has been used to produce fibrous insulation. It has also been known that output of this type of process can be greatly increased by using fiber attenuating wheels of considerably greater length. For example, by increasing the length of the fiber attenuating wheels from around three inches to eighteen inches or more, a considerable increase in the capacity of the fiber forming machine can be effected. A difficulty is presented in a wider production facility of this type in that the fibers produced could not be harvested or collected efficiently by methods and means heretofore available.

Prior harvesting methods usually rely upon a mechanical engagement between the fiber and the harvesting mechanism, such as a blade from a circular saw. Such mechanical engagement generally has an abrading action which tends to weaken or break the fibers. In addition, if the fibers are not completely solidified before their engagement with the harvesting mechanism they will tend to stick thereto or to one another. The fibers will also sometimes stick to the harvesting mechanism should it become overheated. Further, when harvesting devices such as a circular saw blade are used the fibers are frequently collected together in clumps in which the fibers are subjected to a working action one against another which acts to weaken them. If these clumps of fibers are not promptly removed from the fiber forming zone, the fibers are many times partly remelted by heat present in the zone and frequently agglomerated as a solid mass of glass rather than fibers.

It has been found that the freshly attenuated fibers can be easily and efficiently harvested from between the fiberizing drums by engaging their ends with fast moving, generally converging streams of gases to entrain these fibers and pull them from the fiberizing drums. These streams of gases flow generally tangent to the fiberizing drums thereby engaging the fibers near the ends where they attach to the fiberizing drums. These streams of gases may be formed by withdrawing gases from between the fiberizing drums and thereby creating a zone of negative pressure between the harvesting rolls into which the surrounding gases flow. The harvesting mechanism is contoured so that these gases flowing into the zone of negative pressure are directed into engagement with the ends of the freshly formed fibers. It is oftentimes advantageous to move the surfaces of the harvesting mechanism that are contacted by the fibers parallel to the flow of the gases and entrained fibers to reduce the friction between the surfaces of the harvesting mechanism and fibers being pulled from the fiberizing drums.

This movement of the surfaces of the harvesting mechanism contacted by the fibers being harvested will also induce a flow of gases parallel to these moving surfaces. It has been found that on occasion this induced flow of gases adjacent the moving surfaces is by itself adequate to engage and pull the fibers from the fiberizing drums, especially when it is reinforced by the release of gases into the zone adjacent the moving surface to aid the formation of this boundary layer of gases. These reinforcing gases are added to the boundary layer immediately before it engages the ends of the freshly attenuated fibers. By harvesting the virgin fibers with these gaseous streams, weakening of the fibers due to abrasion is greatly lessened because there is little rubbing or mechanical engagement of the fibers by the harvesting mechanism and each fiber is individually carried from the harvesting zone by a non-abrading cushion of air.

It is an object of this invention to provide a harvesting mechanism that will operate equally well for the removal and collection of fibers from both short forming zones and from forming zones of substantial lengths.

It is a further object of this invention to provide a harvesting mechanism which will discharge newly formed fibers uniformly throughout the length of the fiberizing drums to form a pack of uniform character.

Another object of this invention is to provide a harvesting mechanism that will gather the fibers and maintain them as individual fibers until they have been carried from the fiberizing zone.

Another object of this invention is to provide a harvesting mechanism that will not weaken the fibers by abrasive engagement with them.

Although the following description is directed toward the formation of fibers from glass, it is understood that the process is readily adapted to the formation of fibers from other inorganic or organic fiber forming materials.

Our invention will be more fully understood and further objects and advantages thereof will become apparent when reference is made to the following detailed description of the invention and to the accompanying drawings in which.

Figure 1:
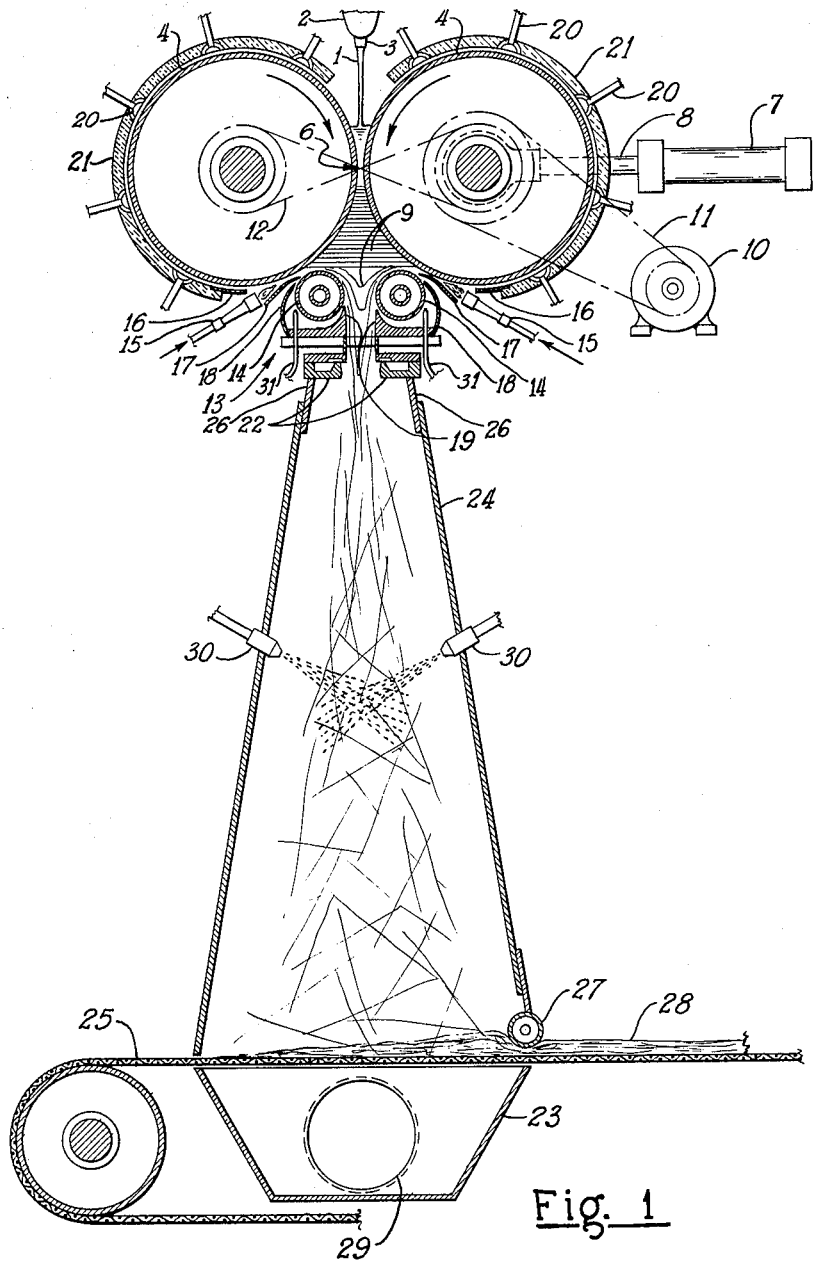
FIGURE 1 is a sectional elevation view of an embodiment of the fiber producing and harvesting apparatus of the present invention.

In setting forth the concepts of the present invention, the harvesting mechanism is first described in relation to a fiber-forming process wherein the fibers are formed between moving diverging surfaces to which molten material in fiber forming condition has been applied. As illustrated in FIGURE 1, a preferred form of the fiber forming apparatus comprises a pair of coacting drums or rolls 4 suitably mounted for rotation on parallel axes and driven by a motor 10 through suitably connected chains or belts 11 and 12. The molten material (such as glass) in fiber forming condition is supplied to the fiberizing drums from a feeder 2 having orifices 3 from which the molten glass flows in the form of a single stream or a plurality of streams depending upon the length of the fiberizing drums.

The molten material falls to the drums 4 and wets them throughout their length. This glass is metered between them in the zone at which they contact one another and then extended or attenuated between their diverging portions, first as webs, and upon further extension as fibers. This attenuation of the fibers occurs along the entire length of the fiberizing drums and where these drums are of appreciable length, considerable difficulty has heretofore been presented in easily and uniformly gathering or harvesting the fibers. Streams of gases flowing adjacent the fiber harvesting roll 4 engage the fibers at their ends near where they are joined to the fiber attenuating drums, pull them from the attenuating drums, and convey them to a fiber collection zone.

The surfaces of the drums are preferably smooth so that uniform fibers may be formed over their entire surfaces. Heater units such as gas burners 20 mounted in a heat insulating covering 21 maintain the temperature of the fiberizing drums within the range at which the fibers will be formed. Hydraulic cylinders 7, which are connected to one of the fiberizing drums through the connecting rod 8, move the fiberizing drums into and out of their operating position. If both drums are driven with a single continuous chain it is possible to separate them from contact with one another without removing the drive chain.

In operation the smooth fiberizing drums are, for example, about 15 inches in diameter and about 18 inches long and are rotated at speeds in the order of 200–500 revolutions per minute. In order to assure that the mate fiberizing drums are covered with glass over their entire length the molten glass is fed thereto as plurality of streams disposed along the entire length of the drums or it is fed as a single stream through an oscillating distributor that spreads it over their entire length. The rate of supply is such that a reservoir of glass is maintained in the nip of the drums. This reservoir levels the flow of glass across the entire face of the drums and helps to smooth over or eliminate the effect of minor irregularities in the rate of feed of the glass to the fiberizing drums.

The amount of glass that passes between the drums and consequently the number and diameter of the fibers formed between the diverging parts of the drums by this process is readily controlled by varying the pressure applied by the cylinders 7. As the surfaces of the two drums separate beneath the bight, the fibers are formed therebetween and as the opposing surface become farther apart the fibers are attenuated to greater lengths and smaller diameter.

According to the present invention the fibers are removed from these fiberizing drums by a harvesting mechanism 13, including a pair of harvesting rolls 14. Burners or heaters 15 and airfoils or shields such as 16, 17, 18, and 19 to restrict and control the flow of heat and air around the harvesting rolls 14 may be utilized to increase the effectiveness and efficiency of the harvesting rolls when fiberizing various materials and under specialized operating conditions. The harvesting rolls and associated equipment normally extends the full length of the fiberizing drums but they may be shortened or lengthened to match the requirements of a particular fiberizing operation.

The removal of the fibers from the fiberizing drums by the harvesting mechanism 13 is aided by a steam blower 22 and/or a suction box 23, which aids the formation of a stream of air flowing over the harvesting rolls.

The fibers 9, after being separated from the fiberizing drums, are carried downward to a collecting zone such as a collecting hood 24 where they are filtered out on a foraminous collecting chain 25. The collecting hood 24 is sealed to prevent air leaks by slidably mounted plates 26 and a similarly mounted roll 27. The roll 27 in addition to preventing the escape of air through the front of the collecting hood 24, may partially compress the pack of collected fibers 28 thereby increasing its integrity.

The air that is forced into the collecting hood by the harvesting rolls and the steam from the blowers 22 are sucked through the collecting chain 25 and into the suction box 23 from which they are exhausted through a duct 29. By forceably withdrawing gases from the collecting hood in this manner a more uniform distribution of the fibers across the conveyor is obtained and turbulence in the collecting hood, which retards the formation of an acceptable mat of fibers, is decreased.

A suitable binder to securely adhere the fibers one to another is sprayed into the collecting hood and onto the fibers by the binder guns 30. Various melamine and phenol-formaldehyde binders have been found satisfactory for this purpose.

Figure 2:
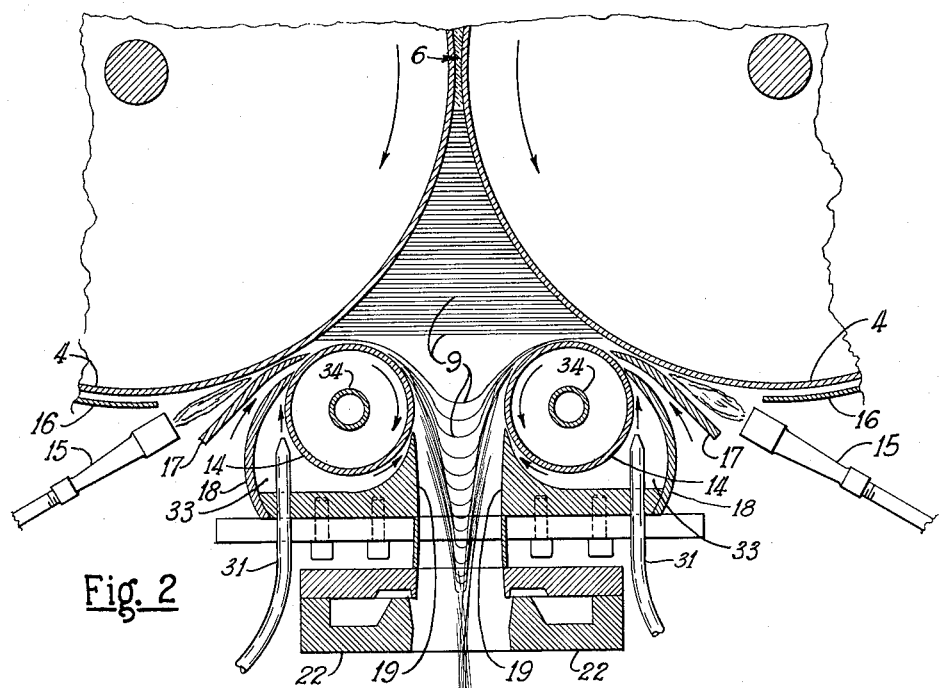
FIGURE 2 is a sectional elevation view on an enlarged scale of the fiber harvesting mechanism of FIGURE 1.

Referring to FIGURE 2, the smooth harvesting rolls 14, by way of example, may be about 4 inches in diameter and are rotated at high speeds in the order of from 3,000 to 8,000 r.p.m. to induce a turbulent boundary layer of gases at their surface. This turbulent boundary layer of gases follows the roll until it is separated therefrom by the shield 19. Once separated from the harvesting roll the gases pass downward into the collection hood.

The harvesting rolls 14 are driven by a motor, not shown, and are mounted on a hollow shaft 34 through which a cooling fluid is passed to prevent their overheating. A plenum chamber 33 is located immediately beneath the harvesting rolls and air or other gases are supplied thereto under pressure through the pipe 31. The shields 16 retard the escape of the hot gases from the burners 20 thereby enabling them to more efficiently maintain the fiberizing rolls at the desired temperature for maximum fiberization of the glass. This shield 16 also directs the gases flowing near it toward the fiber removal zone. A second pair of shields 17 are located between the fiberizing rolls 4 and the harvesting rolls 14. These shields protect the harvesting rolls from heat radiated from the harvesting rolls and from the flame of the burner 15. These shields are contoured so that the gases flowing past them are directed nearly tangent to the harvesting roll 14 so that they become a part of and reinforce the boundary layer of gases flowing therearound. The airfoil 18 forms the back surface of the plenum chamber 33. It is contoured so that the gases escapting upward from the plenum chamber are directed tangent to the harvesting roll 14. Thus, these escaping gases form the foundation of the boundary layer flowing around the harvesting roll 14. Experiments have shown that the ability of the stream of gases to entrain and harvest the fibers is considerably increased when gases are supplied thereto in this manner from the plenum chamber 33.

In operation the harvesting rolls are mounted so that their uppermost surface extends above the bottom of the fiberizing rolls. This overlapping of the fiberizing drums and the harvesting rolls assures that the fibers attenuated between the fiberizing drums are adequately engaged by the harvesting rolls. The rapid rotation of the harvesting rolls induces the formation of a turbulent boundary layer of air flowing over the surface of the harvesting rolls. The ends of the fibers 9 are grouped or entrained by these moving streams of gases and they are then pulled from the fiberizing drums. The precise manner in which the ends of the fibers are pulled from their corresponding fiberizing drum is dependent on a number of things including the viscosity of the glass and the temperature of the harvesting gases. If the glass on the roll at the base of a fiber has a temperature corresponding to a viscosity at which fibers are readily formed the pull on the fibers by the streams of gases will "secondarily" attenuate the fibers until some change occurs at the base of the fiber, such as a deficiency of glass or change in viscosity that render a further attenuation of the fibers impossible at which time the end of fiber will separate from the fiberizing drum. The movement of the fiberizing drums in a direction opposite to the entraining gases in the boundary layer, aids the harvesting of the fibers by supplying a positive attenuating force opposing that of the gases thereby facilitating the separation of the fibers from the fiberizing drums. The gases which form the boundary layer adjacent the harvesting rolls are supplied from at least three places. The first of these is the air which is forced into the plenum chamber 33 behind the harvesting rolls. This air is supplied from a low pressure air line 31 and is bled from the plenum chamber over the harvesting roll 14 and beneath the airfoil 18 to form the foundation of the harvesting boundary layer of gases and aid in cooling the harvesting rolls 14. It is important that the airfoil 18 be extended far enough over the harvesting rolls that the air flowing from underneath it will continue to follow the rotating harvesting roll far enough that it is ejected downwardly into the collecting hood. If the airfoil 18 does not extend far enough over the top of the harvesting roll 14, the boundary layer 32 will tend to escape in a somewhat horizontal direction and its energy will not be fully utilized for the removal of fibers from the fiberizing drums 4 and their subsequent transportation downward into the collecting hood. However, if it extends too far over the top of the harvesting roll it will interfere with the engagement of the fibers by the boundary layer of harvesting gases.

Air is also supplied to aid in forming the boundary layer of harvesting gases from underneath the airfoil 17. This air is induced to flow underneath the airfoil 17 because of a zone of low pressure developed above the harvesting rolls by the removal of gases from this zone when they become a part of the boundary layer and by their inspiration downward into the fiber collecting hood under the action of the blower 22 and the suction box 29.

Additional gases flow into the fiber forming zone and ultimately become a part of the harvesting layer of gases flowing over the airfoil 17. These gases flowing into this region of negative pressure are at least partially heated by the burner 15 thereby providing some environmental control to help maintain the glass on the fiberizing drums within the proper viscosity range to permit its continued attenuation into longer fibers and easy removal of the fibers from the fiberizing drums.

The shield 16 reduces the amount of heat lost from the burners 20 thereby allowing the fiberizing drums to be heated with a relatively low quantity of fuel. This shield also directs the induced air flowing into the fiber attenuating zone away from the fiberizing drums 4 thereby reducing the chilling of the glass and drums by gases circulating near it.

Gases are also bled out of the plenum chamber 33 between the shields 19 and the harvesting rolls 14. These gases flowing counter to the direction of rotation of the harvesting rolls and adjacent thereto separate the boundary layer of gases from the harvesting rolls. These gases in the boundary layer are transferred from the harvesting roll and pass downward into the collecting hood, carrying the harvested fibers with them. The exact point at which the boundary layer of gases and fibers entrained therein are separated from the harvesting rolls is controlled by the height of the shields 19. It is preferably positioned so that the harvesting gases and entrained fibers will be smoothly separated from the harvesting rolls and ejected substantially vertically downwardly into the collecting zone with very little interference thereby utilizing their energy for harvesting the fibers and carrying them to the collection zone. The width of the openings between the shields 19 and the harvesting rolls 14 must be kept small enough that excess gases flowing from the plenum chamber will not interfere with the downward movement of the fibers and that the harvested fibers will not become lodged therein.

The steam or air blower 22 sucks the boundary layer of gases and entrained fibers downward from the harvesting rolls 14 and ejects them into the collecting hood. In many cases, if sufficient suction can be obtained by removing the air through the suction box 23, it is desirable to eliminate this blower because by doing so the amount of air that must be removed from the collecting hood and the turbulence therein will ge greatly reduced.

In operation the fibers are gradually attenuated between and carried downward by the fiberizing drums. As the fibers reach the level of the harvesting rolls the turbulent boundary layers of air which are promoted by these harvesting rolls grab each end of the fiber and pull on it inward away from the fiberizing drum, sometimes secondarily attenuating it, and ultimately removing it from the fiberizing drums. Depending on the particular conditions, this pull on the fibers by the boundary layer of air may be adequate to, in itself, remove the fibers or it may merely hold them until they separate from the fiberizing drums because of the outward movement of the drums.

When the fibers are not removed from the fiberizing drums before the drums have rotated so that the ends of the fibers are positioned in the proximity of the burners 15, they will be promptly severed from the drum under the action of the flame from the burner because of either of softening of the glass on the drum and a subsequent separation of the fiber therefrom or an actual burning of the fiber half. In case the fiber must be cut from the fiberizing drum by burning, the streams of harvesting gases appear to hold the fiber while it is being cut.

This holding of the fibers by the streams of harvesting gases while they are being cut from the fiberizing drums by the burners is quite important because seldom will both ends of a fiber be freed at the same instant. The naturally occurring irregularities in the fiberizing and harvesting systems will generally prevent a simultaneous severance of both ends. If the harvesting streams of gases did not hold the fiber in the flame after one end had been freed from the fiberizing drum, the fiber because of its attachment to the opposing fiberizing drum, would be pulled through the flame and not be cut from the second drum. The fibers that are not removed are not detrimental to the fiber forming operation because they will be remelted and the material refiberized on the next revolution of the drum. However, even though the fiber forming operation is not impaired, the overall efficiency of the process will be greatly reduced if many of the fibers formed are not harvested. It is sometimes possible to eliminate the burners 20 or replace them with heat lamps during the formation of low temperature fibers from materials such as polyvinyl chloride, etc., because the temperature at which they are fiberized and the rate at which heat is lost from these materials is much lower and consequently the material is more easily maintained at a temperature at which fibers are formed.

By increasing the pressure within the steam blower or increasing the amount of air removed from the collecting hood through the suction box and thus increasing the amount of air inspirated over the harvesting rolls, sufficient streams of gases can be formed to engage and pull the fibers from the fiberizing drums even while the harvesting rolls are stationary. However, experiments have shown that if the rolls are left stationary the flow of the air will, while extracting them from the fiberizing drums, pull them downward into contact with the stationary harvesting rolls. Then, in order to separate them from the fiberizing drums, it is necessary for the engagement between the air stream and the fibers to be strong enough to overcome the viscosity of the molten fiber forming material and the friction occasioned by the fibers being pulled over the stationary rolls. By rotating the harvesting rolls slowly in the direction of the flow of the gases, this friction is reduced or nearly eliminated and the engagement of the fibers by the air is generally sufficient to overcome the viscosity and surface tension of the molten fibers forming material and pull the fibers from the fiberizing drums. In all cases the airfoils 16, 17, and 18 direct the gases being inspirated over harvesting rolls so that when these gases contact the virgin fibers they are flowing generally parallel thereto for effective engagement of these fibers.

Figure 3:
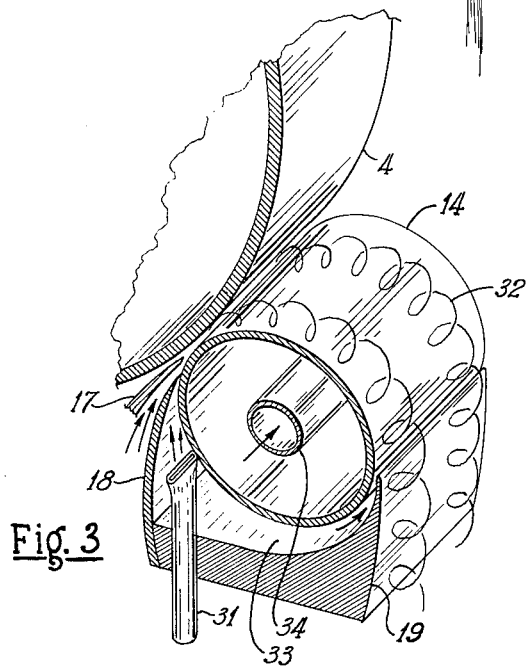
FIGURE 3 is a sectional view of a harvesting roll which more clearly illustrates the manner in which air is utilized in the harvesting mechanism of FIGURES 1 and 2.

Referring to FIGURE 3, the gases from the feed line 31 are fed to the plenum chamber 33 from which they escape under and over the harvesting roll 14. By varying the amount of air fed to the plenum chamber and the width of the exits therefrom, the nature of the boundary layer of gases 32 flowing over the harvesting rolls may be controlled. Also, by varying the speed at which the smooth harvesting rolls revolve the velocity and to some extent the nature of the boundary layer 32 may be controlled. Because of the high temperatures necessary to fiberize many materials, it has been found necessary, in many cases, to cool with water or other liquids the harvesting rolls and the fiberizing drums. This is accomplished by using a hollow axle 34 for the harvesting rolls and fiberizing drums and passing cooling fluids such as water therethrough. In many cases it has also been necessary to water cool the airfoils 16, 17, and 18 by welding to them a tube carrying a suitable coolant.

If the fibers are entrained by the boundary layer 32 while they are still in a plastic condition they will often be elongated or "secondarily attenuated" by the fast moving boundary layer thereby forming much longer, finer, more uniform fibers with less "shot" than would be expected from the dimensions of the fiberizing and harvesting mechanisms.

Figure 4:
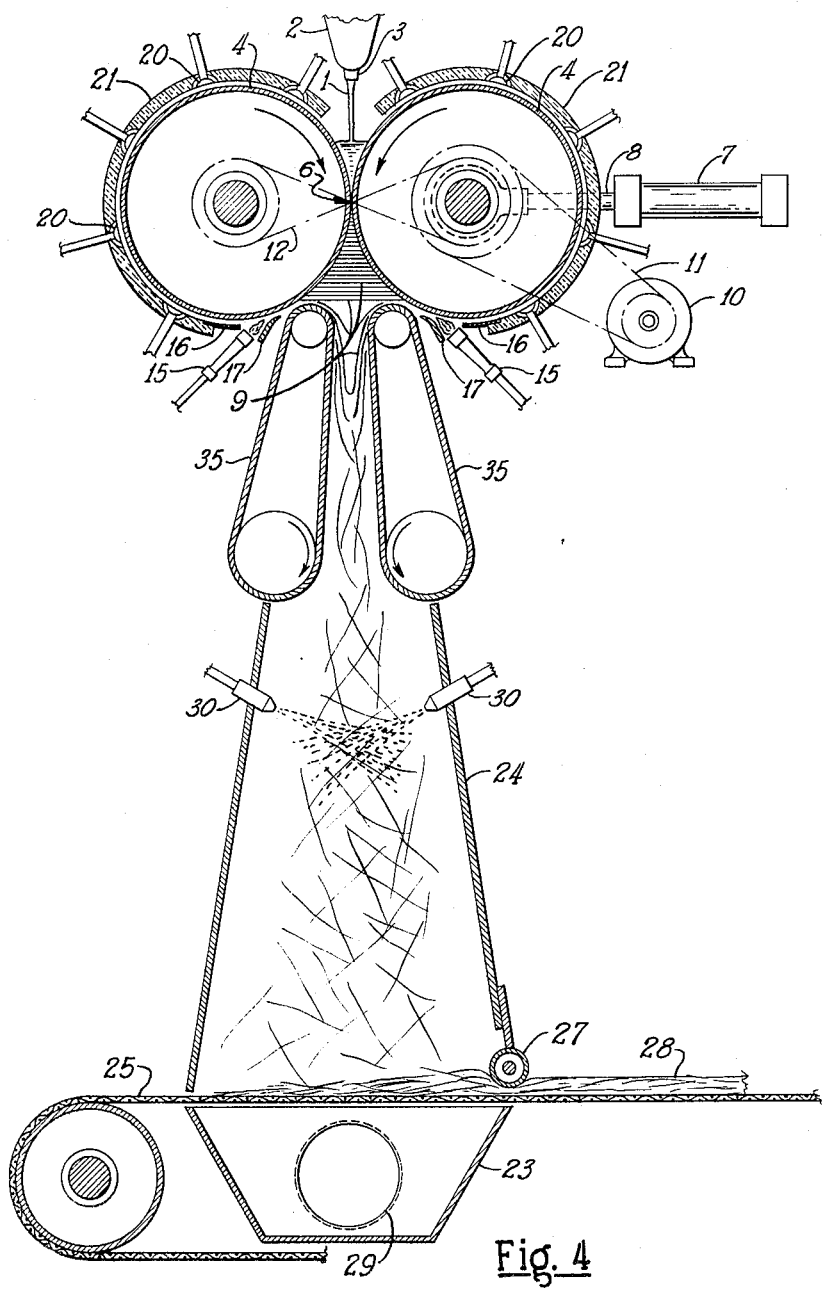
FIGURE 4 illustrates another embodiment of the harvesting mechanism.

Referring to FIGURE 4, the fiberizable material 1 falls from the feeder 2 onto the fiberizing drum 4. Burners 20 maintain these drums at the proper temperature. The fibers are harvested by a pair of steel belts 35 that function similarly to the harvesting rolls shown in FIGURES 1 to 3. These belts have an advantage in that if they are moved at a rather slow speed the fibers will be collected between them as a loose mat which will be carried away as a continuous low density integral insulating mat. A plenum chamber similar to 33 may be built over the outside of the belts to supply gases over the top of the belt for aiding the formation of the boundary layer of gases. This plenum chamber also helps to cool the belt while it is passing therethrough. A plenum chamber can also be used to separate the fibers from the harvesting belts by blowing gases against the bottom edge of the belts near the top of the collecting chamber 24.

It is sometimes possible to remove the fibers by arranging the harvesting belts 35 so that the freshly formed fibers are simultaneously contacted by them and essentially jerked from the fiberizing drums. However, normally the streams of gases flowing adjacent the harvesting belts will engage the fibers and pull them from the fiberizing drums.

Figure 5:
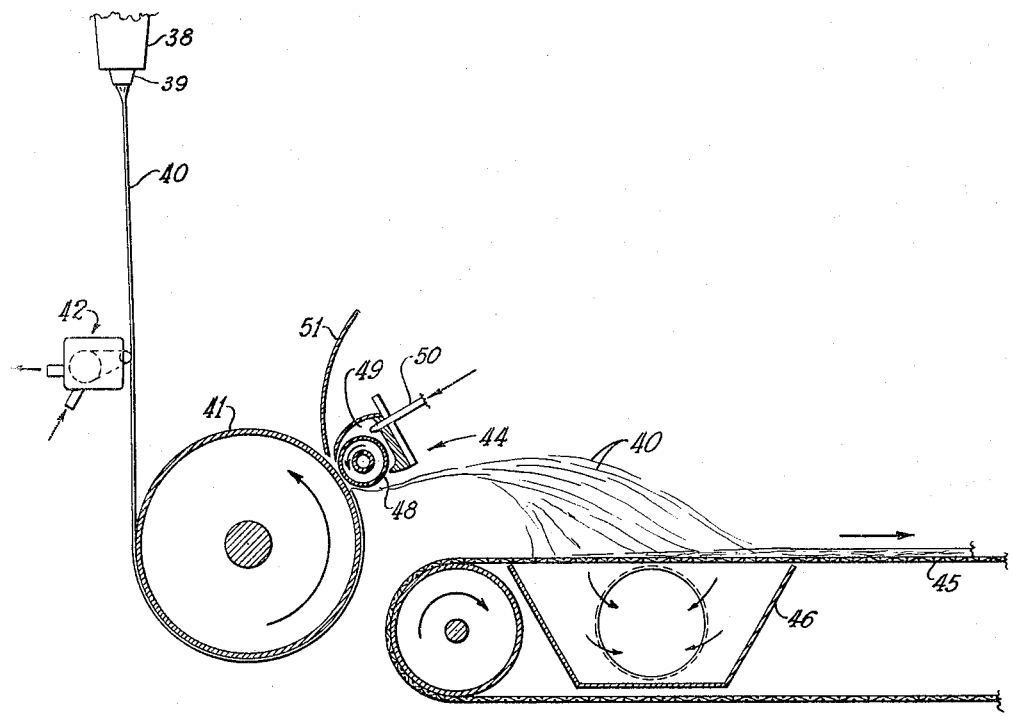
FIGURE 5 is a sectional elevation view of the fiber harvesting mechanism of the present invention for removing fibers from a single fiber attenuating drum.

Referring to FIGURE 5, the molten glass is maintained in a feeder 38. It flows through orifices 39 in the bottom thereof and is attenuated into fine substantially continuous filaments 40 by a large revolving drum 41. A suitable coating or size may be applied to the nascent surfaces of the filaments by the applicator 42. This coating protects the surfaces of the filaments from the abrasive action of the attenuating drum and the adjacent filaments after they have been collected into a mat. In addition, the coating is formulated so that its viscosity and surface tension aid in holding the filaments to the attenuating drum thereby reducing slippage between the attenuating drum and the filaments. The coated filaments 40 are removed from the attenuating drum by a harvesting mechanism 44 and projected outward, somewhat horizontally over the foraminous collecting conveyor 45. They are drawn to the collecting conveyor by withdrawing gases therethrough into plenum chamber 46. The mat 45 of fine filaments is subsequently treated, dried, and packaged for later fabrication into the particular end use desired.

The roll 48 of the harvesting mechanism 48 revolves at a high speed and entrains a boundary layer of gases around it. A shield 51 guides the air inspirated into the area of the harvesting roll by its rotation so that it flows tangent to the harvesting roll thereby reinforcing the boundary layer of gases flowing therearound. Gases are supplied under pressure to a plenum chamber 49 through a gas supply hose 50. The plenum chamber 49 surrounds a portion of the harvesting roll. Gases are bled therefrom over and under the harvesting roll with the gases passing out over the roll reinforcing the boundary layer of gases around the harvesting roll and those under the roll aiding the removal of gases and filaments from the harvesting roll.

The turbulent boundary layer of air surrounding the harvesting roll lifts the filaments from the attenuating drum and redirects them generally horizontally away therefrom. The boundary layer of gases and the filaments therein are separated from the harvesting roll as described with reference to FIGURE 2 wherein the gases escaping under the harvesting roll flowing counter to its direction of rotation with the aid of the adjacent shield lifts the boundary layer of gases from the harvesting roll and the filaments are projected generally horizontally over the collecting conveyor. Then movement of air toward and through the collecting conveyor 45 because of the removal of gases from underneath thereof through the plenum chamber 46 carries the filaments down to the conveyor where they are filtered out onto it.

It is apparent that modifications and different arrangements may be made other than are herein disclosed, the instant disclosure being merely illustrative, and that this invention comprehends all variations thereof.

We claim:

1. A method of harvesting fibers formed between the diverging areas of a pair of tangent, rotating, fiberizing drums comprising rotating a pair of harvesting surfaces at high speed adjacent said fiberizing drums, engaging the ends of said fibers substantially simultaneously with said rotating harvesting surfaces, the engagement between each end of each of said fibers and its corresponding harvesting surface being sufficient to separate that end of said fiber from the attenuating drum to which it is adhered.

2. A method of forming fibers from heat softenable fiber forming material comprising supplying molten fiber forming material to oppositely disposed fiber forming surfaces, separating said surfaces to extend said fiber forming material to form fibers between them, flowing a pair of generally converging gaseous streams over flow defining surfaces extending into the zone in which said fibers are formed and then outward therefrom, engaging said fibers near their ends with said gaseous streams and pulling said fibers from said fiber forming surfaces with said gaseous streams.

3. A method of forming fibers from heat softenable fiber forming material comprising supplying said fiber forming material to oppositely disposed continuously moving fiber forming surfaces, separating portions of said surfaces to extend said material into fibers extending between them, moving a second pair of surfaces at high speeds to induce streams of gases to flow adjacent said second pair of surfaces in intersecting relationship with said fibers, engaging said fibers near their ends with said streams of gases to effect a withdrawal of said fibers from said fiber forming surfaces and an entrainment of them in said gaseous streams, removing said gases and said entrained fibers from the region around said flow inducing surfaces, separating said fibers from said entraining gases and collecting said fibers in loosely integrated relationship.

4. A method of forming fibers from heat softenable fiber forming material comprising supplying molten fiber forming material to oppositely disposed fiber forming surfaces, separating said surfaces to extend said fiber forming material and form fibers between said surfaces, flowing a pair of generally converging gaseous streams over flow defining surfaces extending into the zone in which said fibers are formed, engaging said fibers with said generally converging gaseous streams, holding said fibers with said gaseous streams and simultaneously cutting both ends of said fibers from said fiber forming surfaces, entraining said cut fibers in said gaseous streams, directing said gaseous streams and entrained fibers away from said fiber forming surfaces to a collection surface, and collecting said fibers on said collection surface.

5. The method of claim 4 wherein the fibers are cut from said fiber forming surfaces by gas flames.

6. A method of forming fibers from heat softenable fiber forming material comprising supplying molten fiber forming material to oppositely disposed fiber forming surfaces, extending said fiber forming material into fibers between said forming surfaces by separating said surfaces, rotating a pair of mated harvesting rolls adjacent said surfaces, flowing a stream of gases over a portion of the periphery of such of said rotating harvesting rolls in the direction of their rotation, engaging the ends of said fibers with said gaseous streams, the engagement between said stream of gases and said fibers being such as to secondarily attenuate said fibers and pull each end of each fiber from its corresponding fiber forming surface, directing said streams of gases and the harvesting fibers entrained therein away from said harvesting rolls to a collection surface, and collecting said fibers on said surface.

7. A method of forming fibers from heat softenable fiber forming material comprising supplying said fiber forming material to oppositely disposed fiber forming surfaces, separating said surfaces to extend said material into fibers between them, flowing gaseous streams over a pair of flow control surfaces positioned so as to extend at least into the zone between said separated fiber forming surfaces, engaging said fibers with said gaseous streams to pull said fibers from said fiber forming surfaces, reducing friction between said fibers and said flow control surfaces by moving the portions of said flow control surfaces which are contacted by said fibers generally parallel to the flow of said gases and collecting said free fibers in loosely integrated relationship on a foraminous collection surface.

8. A method of forming fibers from molten fiber forming material comprising supplying said material in fiber forming condition to a pair of elongated co-acting fiberizing drums, extending said material into fibers between the diverging areas of said drums, rotating a pair of fiber harvesting rolls in intersecting relationship with the ends of said fibers, flowing a stream of gases over each of said harvesting rolls, engaging the ends of said fibers with said streams of gases to pull said fibers from said fiberizing drums and carrying said free fibers to a fiber collecting zone.

9. A method of harvesting fibers extending between a pair of oppositely disposed fiber forming surfaces having an associated pair of harvesting rolls having their upper portion extending into the bight between said fiber forming surfaces comprising inducing a stream of gases to flow adjacent the surface of each roll by rotating said harvesting rolls at high speed, reinforcing said streams of gases by supplying additional gases to said induced streams from a pressurized supply zone adjacent each of said harvesting rolls, engaging each end of said fibers with one of said reinforced streams of gases to pull that end from its corresponding fiber forming surface, entraining said free fibers in said gaseous streams and carrying said entrained fibers to a fiber collecting zone.

10. Apparatus for harvesting fibers extending between a pair of diverging fiber forming surfaces comprising a pair of smooth, imperforate, rotatable harvesting rolls, means for rotating said rolls at high speeds, pressurized gas supply means for supplying gases immediately adjacent said harvesting rolls, said gas supply means being positioned so that the gases flowing therefrom contact the fibers extending between the fiber forming surfaces and assist in pulling them therefrom.

11. Apparatus for harvesting fibers comprising a pair of smooth, rotatably mounted harvesting rolls, drive means for rotating said rolls, a plenum chamber for retaining gases under pressure located adjacent each of said rolls, each of said plenum chambers having an opening extending the length of and adjacent the roll, said opening being positioned so that the gases flowing from that plenum chamber contact the harvesting roll immediately before said roll contacts the fibers, gas removal means for removing all of the gases and the harvested fibers entrained in said gases from around each of said harvesting rolls, said gas removal means being disposed so that the gases and entrained fibers from both of the harvesting rolls are projected towards a common collection zone.

References Cited by the Examiner

UNITED STATES PATENTS

| | | | |
|---|---|---|---|
| 2,274,130 | 2/1942 | Davis | 18—2.5 |
| 2,398,707 | 4/1946 | Hawthorne et al. | 65—15 |
| 2,605,499 | 8/1952 | Powell | 65—14 X |
| 2,605,503 | 8/1952 | Powell | 65—14 |
| 2,750,317 | 6/1956 | Manning | 156—167 |
| 2,758,335 | 8/1956 | Overman | 18—2.5 |
| 2,976,580 | 3/1961 | Riedel | 65—13 |

DONALL H. SYLVESTER, *Primary Examiner.*

MICHAEL V. BRINDISI, *Examiner.*